3,093,560
METHOD OF PREPARING POLYFORMALDEHYDE MATERIAL HAVING IMPROVED CHARACTERISTICS

Robert Fourcade, Gosnay, France, assignor to Houilleres du Bassin du Nord & du Pas-de-Calais, Douai, Nord, France, a French public establishment of France
No Drawing. Filed July 22, 1959, Ser. No. 828,730
Claims priority, application France July 23, 1958
3 Claims. (Cl. 204—154)

This invention relates to the preparation of formaldehyde polymer or polyformaldehyde materials of improved characteristics. Formaldehyde is known to possess the property of forming high molecular weight polymers having many valuable characteristics generally similar to synthetic plastics. Various processes have been proposed heretofore for the production of such polymers, usually with the assistance of catalysts, but the resulting products have not been fully satisfactory.

Polyformaldehydes will form from formaldehyde stock at practically any temperature, but it is found that the polymerization generally proceeds in a disorderly manner, the resulting polymer comprising molecular chains of random lengths and orientation. Moreover, the polymerization is usually reversible, in that the polymer formed will revert to formol on heating.

It is on the other hand an object of this invention to produce polyformaldehyde materials comprising molecular chains of long uniform length hence having improved homogeneity, and such materials that will be stable and will not revert to formol on heating.

Another object is to produce such improved polyformaldehyde materials without the use of catalysts.

The invention is based on the surprising discovery that improved polyformaldehyde having the advantageous properties just mentioned can be produced without the use of any catalyst by exposing formaldehyde to ionizing radiation at a very low temperature, under $-60°$ C., and preferably under $-120°$ C.

While the use of ionizing radiations for inducing or assisting polymerization of various monomers is well-known, it has heretofore only been applied, to the best of applicant's knowledge, to polymerization processes of a radical character. The polymerization of formaldehyde, however, has heretofore consistently been regarded as pertaining to the ionic, as distinct from the radical, class, and for this reason apparently investigators have refrained from testing the results of applying ionizing radiations to formaldehyde. In any case, such ionizing irradiation is only effective when applied under the low-temperature conditions specified in accordance with the invention. The fact, however, that ionizing irradiation is effective at all in connection with formaldehyde is an unexpected and surprising discovery not believed to have been foreshadowed in the prior art.

In accordance with the invention, therefore, formaldehyde monomer stock at a temperature of less than $-60°$ C. and preferably less than $-120°$ C., is exposed to ionizing irradiation to a total dose of from about 500 to 10,000 Roentgens. The expression "ionizing irradiation" is used in its usual meaning to include both radiation from radioactive sources, and particle bombardment from suitable particle, e.g. electron, accelerators, such as Van de Graaf machine for example.

The rate or intensity of the irradiating source is not critical except insofar such rate is in inverse proportion to the necessary time of exposure, since a total dose of at least about 500 Roentgen units must be attained as indicated above. A practically satisfactory range for ionizing rate is from 5 to 15 R./minute.

The temperature factor is important, and it has been found that the polymerization reaction proceeds in significantly different ways depending on the temperature used within the range specified in accordance with this invention. Thus, where the temperature used is less than about $-190°$ C., the polymerization reaction is substantially inhibited, but will then set in suddenly as the temperature rises, into the range from $-190°$ to $-170°$ C., whereupon the major part of the monomer polymerizes in a quasi-instantaneous manner, inducing a sudden elevation in the temperature of the mass to about $-110°$ to $-100°$ C.

If on the other hand the irradiation is performed at a somewhat higher temperature in the afore-stated range, e.g. at about $-130$ to $-120°$ C., the polymerization progresses gradually during the irradiation step itself. It is also found that in this case the conversion ratio of monomer to polymer is higher.

The total dose of radiation to which the monomer is exposed should preferably not be too great, since otherwise polymerization while very complete, proceeds in a violent and disorderly manner, leading to a non-uniform micro-crystalline structure of the polymer which would be objectionable in many applications. The upper limit of the total irradiation dose may then be set at a value of about 10,000 Roentgen units. As to the lower limit, this is determined by economic conditions since the conversion ratio or yield is crudely proportional to the irradiation dose. Thus a lower economically feasible limit may be set at about 500 Roentgens. However, both above-indicated limits are indicative rather than restrictive, and the optimum irradiation amounts should be determined by test.

Some examples will now be described of the procedure used in a few practical applications of the invention, it being understood of course that various modifications in the specific conditions stated therein may be introduced by those familiar with the art in accordance with the final results desired for the product.

Example 1

In a 10 cc. glass phial, 8.8. g. of pure, newly prepared, substantially anhydrous (less than $10^{-4}$ water) formaldehyde monomer are condensed in Dry Ice. The contents of the phial is then frozen in liquid nitrogen at about $-130°$ C. The phial is connected up with a vacuum pump and the contents of the phial is de-gassed by repeated melting and solidification steps. The phial is sealed and placed at a distance of 5 cm. from a 15 Curie source of Co 60, still at the temperature of the liquid nitrogen, for a period of 42 hours. The phial is then opened and there is collected 7.9 g. of a product which, under ordinary temperature conditions, is a white solid melting at 180° C., inherent viscosity 4.3. The yield is thus about 89.9%. When pressed for 3 minutes at 180° it forms a hard translucent sheet having the following characteristics: Tensile strength 7 kg./sq. mm. Elastic elongation 20%. Young's modulus 4,000. When heated at 200° C. the substance loses less than 0.1% of its weight per minute.

Example 2

Using the same general procedure as in Examples 1, 3, 7 g. of monomer are exposed to a 14 R./minute source for 90 minutes, i.e. a total dose of 1260 R. During irradiation the temperature remains in the range of $-196$ to $-190°$ C. Polymerization sets in rapidly after the temperature is allowed to rise above this last value, and the temperature rises suddenly to $-91°$ C. The conversion ratio or yield is 16.5%.

Example 3

The same procedure is applied to 2.83 g. of the monomer using irradiation at a rate of 14 R./mn. over 60 minutes, a total dose of 840 R. The temperature during exposure varies from −196 to −190° C. At the instant of polymerization the temperature rises sharply to −112° C. The conversion yield is 11.5%.

*Example 4*

The same procedure is applied to 3.2 g. monomer which is exposed to 14 R./minute for a period of 30 minutes, a total dose of 420 R. The temperature during this time varies from −196 to −166° C. At the instant of polymerization, the temperature rises sharply to −100° C. The yield is 8.7%.

In other experiments the monomer material was exposed to much higher doses of radiation. Thus in one experiment a phial containing 9 g. monomer at −196° was irradiated with an X-ray source of 1 mev. at a rate of 1500 R./minute up to a total dose of 45,000 R. Examination of the sample showed that the monomer was polymerized to an extent of 100%, but the resulting product was formed of aggregates of randomly oriented microcrystals. Melting range was 175–180° C.

What I claim is:

1. A non-catalytic method of producing polyformaldehyde having molecular chains of long uniform length and which is stable at elevated temperatures, comprising exposing formaldehyde to a total dose of high energy, ionizing irradiation in the range between approximately 500 and 10,000 Roentgen units at a temperature in the range between approximately −60° C. and −190° C.

2. The method as in claim 1; wherein said temperature is less than −120° C.

3. The method as in claim 1; wherein said temperature is in the range between −120° C. and −130° C.

References Cited in the file of this patent

UNITED STATES PATENTS 2,734,889    Starr ------------------ Feb. 14, 1956

OTHER REFERENCES

Henglein et al.: Die Makromolekular Chemie, vol. 31, pp. 181–191 (March 20, 1959).

McLennan et al.: "Canadian Journal of Research," pp. 470–481, vol. 5 (1931).